Figure 1:
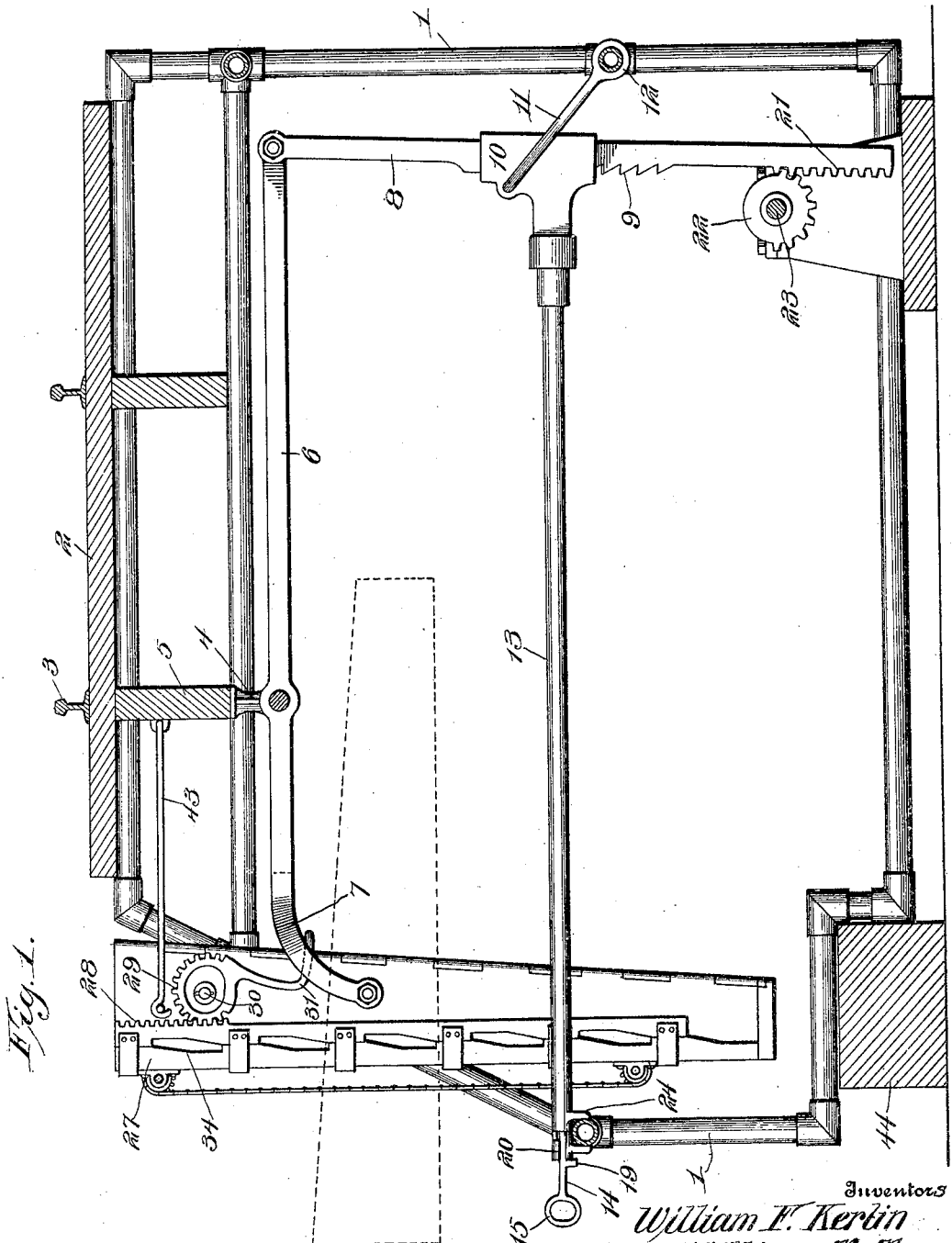

No. 805,018. PATENTED NOV. 21, 1905.
W. F. KERLIN & W. N. MAY.
MOLDING APPARATUS.
APPLICATION FILED MAY 16, 1905.

2 SHEETS—SHEET 1.

Witnesses
Louis D. Heinrichs
Herbert D. Lawson

Inventors
William F. Kerlin
William N. May
By W. J. FitzGerald
Attorneys

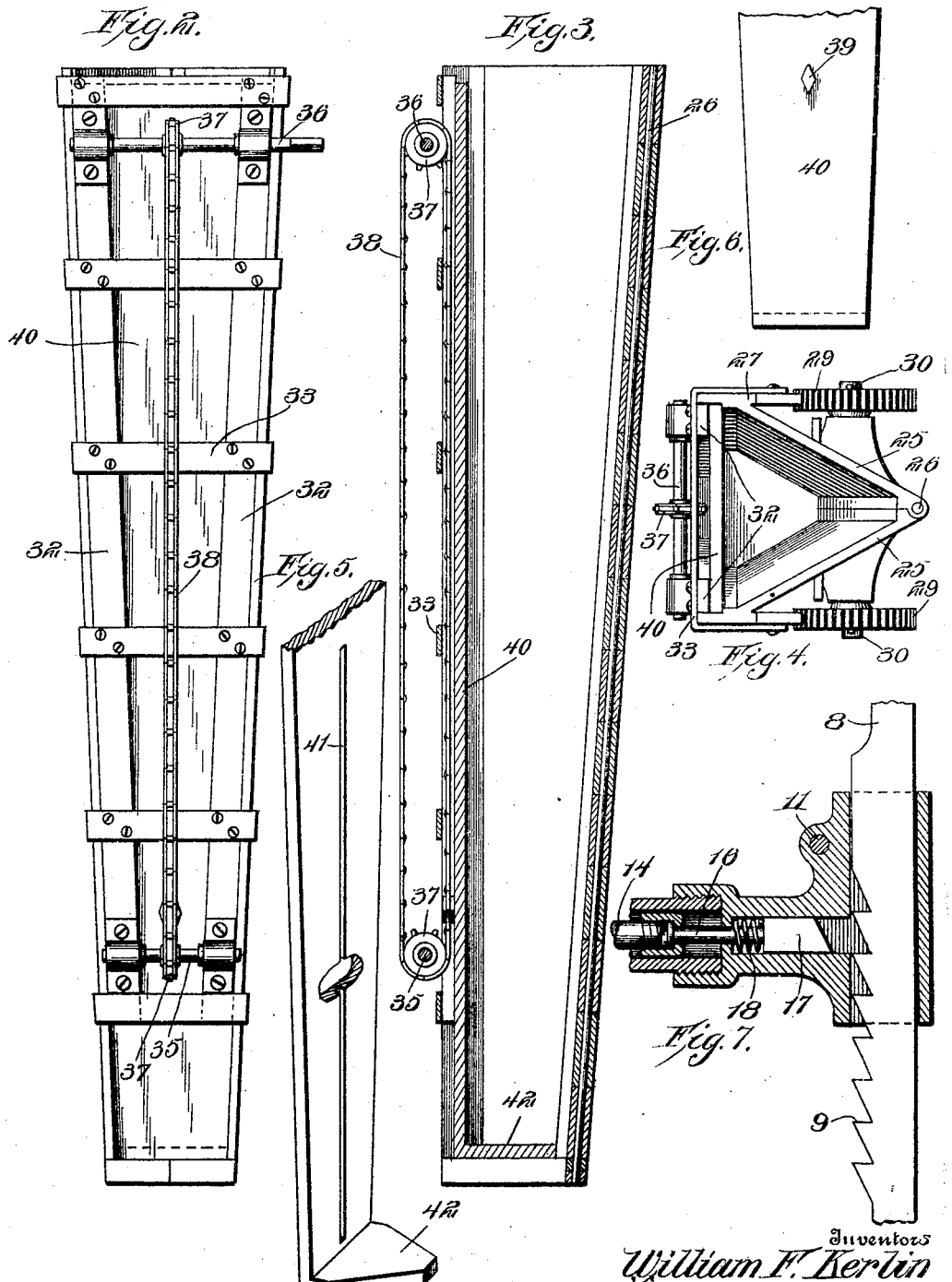

UNITED STATES PATENT OFFICE.

WILLIAM F. KERLIN AND WILLIAM N. MAY, OF ROCKFIELD, INDIANA; SAID MAY ASSIGNOR TO SAID KERLIN.

MOLDING APPARATUS.

No. 805,018.   Specification of Letters Patent.   Patented Nov. 21, 1905.

Application filed May 16, 1905. Serial No. 260,701.

*To all whom it may concern:*

Be it known that we, WILLIAM F. KERLIN and WILLIAM N. MAY, citizens of the United States, residing at Rockfield, in the county of Carroll and State of Indiana, have invented certain new and useful Improvements in Molding Apparatus; and we do hereby declare the following to be a full, clear, and exact description of the invention, such as will enable others skilled in the art to which it appertains to make and use the same.

Our invention relates to machines for producing posts and like articles from concrete, &c.; and its object is to provide means whereby the mold of the machine can be rapidly raised and dropped during the filling operation, so as to tightly pack the material therein and to prevent the formation of air-holes within the post structure.

A still further object is to provide a mold of peculiar construction which can be quickly opened to permit the withdrawal of the molded object therein.

Another object is to provide means to facilitate the removal of the molded object from the mold.

A still further object is to provide mechanism for throwing the gearing of the "jumping" device into or out of operative relation with its driving mechanism.

With the above and other objects in view the invention consists of a lever adapted to be rocked by a peculiar arrangement of gears whereby one end of the lever will be raised and then quickly released and permitted to fall, this operation being repeated continuously as long as desired. A mold of peculiar construction is pivotally connected to one end of the lever and is adapted to be raised and dropped therewith. A bed is provided under the mold and is adapted to be contacted thereby to constitute a solid resistance, whereby any material contained within the mold when it is dropped upon the bed will be tightly packed. The mold used in connection with the apparatus consists of side walls, which are hinged together, and a pallet-supporting slide which is mounted between the edges of the hinged walls and is so connected thereto as to be drawn toward or moved away from the walls and at the same time cause the contraction or lateral expansion of the mold. The pallet is adapted to engage the mechanism, which when operated will slide said pallet out of the mold, so that the molded object resting thereon can be readily removed to any suitable point where it can be dried.

The invention also consists in further novel construction and combination of parts hereinafter more fully described and claimed.

In the accompanying drawings we have shown the preferred form of our invention, and in said drawings—

Figure 1 is a vertical section through the frame of our machine and showing in elevation the mold and its jumping mechanism, the mold being shown in a horizontal position by dotted lines. Fig. 2 is a front elevation of the mold. Fig. 3 is a central vertical section therethrough. Fig. 4 is a plan view of the mold. Fig. 5 is a perspective view of one end of the pallet, a portion of said end being removed to show the depth of the groove in the pallet. Fig. 6 is an elevation of said end of the pallet, but showing the outer face thereof; and Fig. 7 is an enlarged section through the guide-sleeve and showing in elevation the locking-plunger therein.

Referring to the figures by numerals of reference, 1 is a frame formed of metal tubing or any other suitable material and supporting a platform 2, on which may be located a track 3 for cars (not shown) containing concrete from which posts are to be formed. A hanger 4 is connected to one of the sills 5 of platform 2, and to this hanger is fulcrumed a lever 6, one end of which is forked, as at 7, and is connected to a mold such as will be hereinafter described. The other end of the lever has a pitman 8 pivoted to it, and this pitman has ratchet-teeth 9 extending from one face at a point between its ends, and the toothed portion of the pitman is slidably mounted within a guide-sleeve 10. This sleeve has a yoke 11 pivoted within and extending transversely therethrough, and the yoke is also pivoted, as at 12, to a portion of the frame 1. The guide-sleeve 10 has a tubular stem 13 extending from it, and within the stem is slidably mounted a rod 14, provided with a handle 15 at its outer end. The inner end of the rod 14 is swiveled to a stem 16, projecting from a plunger 17. A coil-spring 18 is disposed in rear of the plunger and is adapted to exert a continual pressure thereagainst, so that the plunger will be held normally in engagement with one of the teeth 9 upon the pitman. In order to hold the plunger normally out of engagement with said teeth, we provide the rod 14 with a lug 19, adapted to engage the end of the tubular stem 13 and hold the plunger 17 retracted. When it is desired to throw the plunger into engagement with the teeth, the rod 14 is rotated so that the lug 19 thereon will register with and move into a slide 20, formed within the end of the tube 13. A rack 21 is formed upon the pitman 8 and is adapted to mesh with a segmental gear 22, mounted on a shaft 23, which is rotated by any suitable power.

Parallel ears 24 extend downward from the tubular stem 13 and are adapted to engage a portion of the frame 1, so as to hold the rack of pitman 8 normally in operative relation with the segmental gear 22. By raising the tubular stem 13 so as to disengage its ears 24 from frame 1 the said stem 13 can be moved longitudinally, so as to force the pitman 8 away from gear 22.

As hereinbefore stated, the yoke 7 of lever 6 is pivoted to a mold. As shown particularly in Figs. 2, 3, and 4, this mold consists of side walls 25, which are hinged together along one edge, as at 26, and are adapted when the mold is closed to assume a position at an angle to each other. The two side walls are tapered from end to end, so that the product of the mold will be an angular tapered post. Each side wall is provided at its free edge with a flange 27, on which is slidably mounted a rack-bar 28, which meshes with a toothed cam 29, rotatably mounted on suitable bearings 30 provided therefor upon the side walls 25. The two cams are connected by means of a yoke 31, whereby they can be rotated in unison.

Located between the free edges of the side walls 25 is a slide consisting of converging side strips 32, connected at desired intervals by straps 33, which overlap the side walls 25 and are secured to the rack-bars 28. The side strips 32 are so disposed in relation to each other that when the slide formed by said strips and their straps 33 is located in the upper or large end of the mold the same will fit snugly therein and at the same time permit the side walls 25 to assume their normal closed positions. The adjoining faces of the flanges 27 and the rack-bars 28 are recessed, as at 34, and the walls of these recesses are inclined, so that when the rack-bars 28 are moved longitudinally upon the flanges they will travel into the recesses therein, so as to permit the slide formed of strips 32 and straps 33 to move away from the walls 25.

In order that the gears 29 may mesh with the rack-bars 28 at all times during this outward movement, we form said gears in the shape of cams, which insures the meshing of the two parts at all times.

Shafts 35 and 36 are journaled upon opposite ends of the slide of the mold and have sprockets 37 thereon, on which is mounted an endless chain 38. This chain is adapted to be engaged by a lug 39, formed upon the outer face of a pallet 40, which normally fits snugly between the side walls 25 and upon the side strips 32 of the slide. The inner surface of the pallet is preferably formed with a longitudinally-extending groove 41 for the reception of the blade of the fence-post, which is provided to facilitate the attachment of the wires or fabric of the fence to the post. A foot 42 is located at the small end of the pallet and is adapted to fit within the small end of the mold. A yoke 43 is pivoted to the sill 5 and is parallel with lever 6, and this yoke is detachably connected to the upper portion of the mold and serves to hold said mold in an upright position during the jumping operation.

In using the machine herein described the mold is secured in an upright position by means of the yoke 43, and yoke 31 is swung downward, so as to cause the rack-bars 28 to assume positions shown in Fig. 1. Ears 24 are then placed in engagement with frame 1, and rod 14 is drawn out and held by means of its lug 19, so that the plunger 17 will not engage the ratchet-teeth 9. The shaft 23 is then rotated, and each time its gear 22 meshes with the rack 21 it will draw the pitman 8 longitudinally and raise the mold from the bed 44, which is located thereunder. As soon as the gear-teeth move out of engagement with the rack 21 the mold will drop by gravity into violent contact with the bed 44 and the pitman will reassume its normal raised position, where it will remain until the teeth of gear 22 again engage it. During this reciprocating movement of the pitman 8 the sleeve 10 serves as a guide to hold it in proper relation to the gear 22. As the mold is "jumped" in this manner material is fed slowly thereinto and will, as is obvious, become packed therein. By reason of the violent impact of the mold upon the bed 44 the formation of air-holes within the molded object is absolutely prevented, and, moreover, the liquid portion of the concrete or cement fed to the mold is forced to the outer surface, and a better appearing and finished article is therefore produced than where the material is packed by tamping with tools in the ordinary manner. After the mold has been filled and properly packed the rod 14 is turned so that its lug 19 can slide within the slot 20, and the spring-pressed plunger 17 promptly moves into engagement with the ratchet-teeth 9 on the pitman 8 and prevents the rack 21 of the pitman from returning into position to be reengaged by the gear 22 after said rack has been once forced downward. The further jumping of the mold is thus prevented, and by raising the ears 24 from engagement with the frame 1 the entire pitman 8 can be swung away from gear 22. The pivots of the mold are so located that the mold can be easily swung into a horizontal position, as shown by dotted lines in Fig. 1, and after it has assumed this position the yoke 31 is swung upward, so that the cams 29 will force the rack-bars 28 longitudinally. These rack-bars will move the straps 33 and side strips 32 with them, and said side strips will act as a wedge to force the side walls of the mold apart. At the same time the rack-bars will enter the recesses 34 in flanges 27, and therefore the pallet 40 and its supporting-slide will be moved downward away from the mold-walls 25. As soon as the mold has been opened in this manner the shaft 36 is rotated by means of a crank or other suitable tool, and the lug 39 on the pallet engages the chain 38, and as said chain is moved with the sprockets 37 it will slide the pallet off of the side strips 32 and will carry therewith the molded object. Another pallet can then be inserted and all of the parts restored to their normal positions by reversing the operations above described.

By providing a machine such as herein described fence-posts and other like articles can be quickly molded, and a superior product is obtained, for the reason that the formation of air-holes is prevented, and as the liquid portion of the concrete is forced to the outer surface of the molded object the product presents a smooth and neat appearance when removed and dried.

In the foregoing description we have shown the preferred form of our invention; but we do not limit ourselves thereto, as we are aware that modifications may be made therein without departing from the spirit or sacrificing the advantages thereof, and we therefore reserve the right to make such changes as fairly fall within the scope of our invention.

Having thus fully described our invention, what we claim as new, and desire to secure by Letters Patent, is—

1. In a machine of the character described the combination with a bed and a mold normally supported thereabove and out of contact therewith; of means for automatically dropping the mold upon the bed, and mechanism for locking the mold in raised position.

2. In a machine of the character described the combination with a mold and a bed therefor; of a power device, mechanism operated by said device for alternately raising the mold and dropping it upon the bed, and means for locking the mold above and out of contact with the bed during the operation of the power device.

3. In a machine of the character described the combination with a mold and a bed therefor; of a power device, mechanism operated by said device for alternately raising the mold and dropping it upon the bed, means for raising said mechanism from the power device, and means for locking the mold above and out of contact with the bed during the operation of the power device.

4. In a machine of the character described the combination with a mold and a bed therefor; of a power device, mechanism operated by the device for alternately raising the mold and dropping it upon the bed and means for automatically locking said mechanism out of operative relation with the power device.

5. In a machine of the character described the combination with a rotatable segmental gear; of a mold, a bed therefor and mechanism adapted to be intermittently actuated by the gear for alternately raising the mold and releasing and dropping it upon the bed.

6. In a machine of the character described the combination with a mold and a bed therefor; of a lever pivoted to the mold, a rack pivoted to the lever and a segmental gear for intermittently engaging the rack to alternately raise the mold and release and drop it upon the bed.

7. In a machine of the character described the combination with a mold and a bed therefor; of a lever pivoted to the mold, a pitman pivoted to the lever and having ratchet and rack teeth thereon, a segmental gear for intermittently engaging the rack-teeth to alternately raise the mold and drop it on the bed, a guide-sleeve surrounding the ratchet portion of the pitman and means within the sleeve for engaging the teeth to prevent movement of the pitman in one direction.

8. In a machine of the character described the combination with a mold and a bed therefor; of a lever pivoted to the mold, a pitman pivoted to the lever and having ratchet and rack teeth thereon, a segmental gear for intermittently engaging the rack-teeth to alternately raise the mold and drop it on the bed, a guide-sleeve surrounding the ratchet portion of the pitman, means within the sleeve for engaging the teeth to prevent movement of the pitman in one direction, and a lock for holding said means out of engagement with the pitman.

9. In a machine of the character described the combination with a mold and a bed therefor; of a lever pivoted to the mold, a pitman pivoted to the lever and having ratchet and rack teeth thereon, a segmental gear for intermittently engaging the rack-teeth to alternately raise the mold and drop it on the bed, a guide-sleeve surrounding the ratchet portion of the pitman, means within the sleeve for engaging the teeth to prevent movement of the pitman in one direction, a lock for holding said means out of engagement with the pitman, a supporting-frame for the lever, a linked connection between the guide-sleeve and the frame and means for locking the sleeve against movement.

10. In a machine of the character described the combination with a supporting-frame and a platform thereon; of a lever fulcrumed on the frame, a mold pivoted to one end of the lever, a bed below the mold, a segmental gear, a pitman pivoted to the lever and having ratchet and rack teeth thereon, said rack-teeth meshing with the gear, a movable guide for the pitman connected to the frame and means for operating the guide to throw the pitman out of engagement with the gear.

11. A mold comprising hinged side walls, a slide mounted between said walls and constituting a wall of the mold, a slidable element upon each of said walls and movable with the slide and means upon the hinged walls of the mold for engaging said element and imparting longitudinal movement to the slide.

12. In a mold the combination with hinged side walls tapered toward one end; of a wedge-shaped slide interposed between the walls, and means movably mounted on the side walls for simultaneously engaging opposite sides of the slide to move the same longitudinally and spread the walls apart.

13. In a mold the combination with side walls hinged together and tapered toward one end; of a wedge-shaped slide interposed between one edge of the walls and constituting a wall of the mold and means upon the hinged walls for imparting longitudinal movement to the slide to spread the hinged walls.

14. In a mold the combination with hinged side walls tapered toward one end; of a wedge-shaped slide interposed between one edge of the walls, slidable elements upon said walls and secured to the slide and means upon the hinged walls for simultaneously engaging said elements and moving the slide away from and longitudinally between the side walls.

15. In a mold the combination with hinged side walls tapered toward one end; of a wedge-shaped slide interposed between one edge of the walls, a pallet slidably mounted upon the slide, means for moving the pallet longitudinally upon the slide and means for simultaneously moving the slide and pallet away from and longitudinally between the walls of the mold.

16. In a mold the combination with hinged side walls; of a slide interposed between one edge of the walls, rack-bars movable with the slide and toothed cams mounted upon the side walls and meshing with the racks.

17. In a mold the combination with hinged side walls having recessed flanges; of a slide interposed between one edge of the side walls, recessed rack-bars movable with the slide and mounted upon the recessed flanges and toothed cams upon the side walls and meshing with the rack-bars.

18. In a mold the combination with hinged side walls having recessed flanges; of a slide interposed between one edge of the side walls, recessed rack-bars movable with the slide and mounted upon the recessed flanges, toothed cams upon the side walls and meshing with the rack-bars, a pallet mounted upon the slide and means on said slide for moving the pallet longitudinally thereon.

19. The combination with a mold; of a pallet slidably mounted upon the wall thereof, and means upon said wall for imparting longitudinal movement to the pallet.

20. The combination with a mold; of a pallet slidably mounted upon one wall thereof and within the mold, an endless actuating device upon said wall, and means upon the pallet for detachably engaging said actuating device.

21. The combination with a mold; of a pallet slidably mounted upon one wall thereof, an endless chain movably mounted upon said wall, means for actuating the same, and a device upon the pallet and detachably engaging the chain.

In testimony whereof we have signed our names to this specification in the presence of two subscribing witnesses.

WILLIAM F. KERLIN.
WILLIAM N. MAY.

Witnesses:
W. B. RAY,
G. V. SHEETS.